Oct. 4, 1932.   N. E. L. MEANS   1,881,285

FLOATING FISHING LURE AND METHOD OF MAKING SAME

Filed Sept. 24, 1929

INVENTOR:
Norman E. L. Means

By Laurie L. Miller
ATTORNEY

Patented Oct. 4, 1932

1,881,285

UNITED STATES PATENT OFFICE

NORMAN E. L. MEANS, OF MISSOULA, MONTANA

FLOATING FISHING LURE AND METHOD OF MAKING SAME

Application filed September 24, 1929. Serial No. 394,889.

This invention relates to an improved floating fish lure and method of making same. It is well known that game fish are quite wary of artificial baits and are quick to detect crude and ill formed lures. Furthermore these fish have very discriminating tastes and quickly detect and shun a lure which acts in an unnatural manner. It is the primary object of my invention to provide an improved floating lure and method of making same which is more natural in appearance and which functions in a more natural manner.

A floating lure, to be effective, must simulate natural bugs, both in size and appearance, and must be so buoyant that the attached line will not drag the lure under water in the fishing operation. Fish lures heretofore made have contained too much wire and dense material to float naturally and have been too cumbersome to properly represent the small bugs, moths and beetles on which the fish feed. It is a further object of my invention to provide a method of making a lure whereby the natural insects can be artfully imitated and a lure provided which will function naturally in the fishing operation.

One of the particularly novel features of my invention resides in the use of hair for wings. The hair, being hollow, provides buoyancy and my method of treating the hair, as hereinafter described, provides means for controlling the size, shape and appearance of the wings to simulate the various forms of bugs. A further object of my invention resides in this treatment of the hair for the purposes described.

With the above and other objects in view, my invention consists of the features of construction and operation set forth in the following specification and illustrated in the accompanying drawing. In such drawing I have illustrated certain specific embodiments of my invention but it will be understood that the invention can be otherwise embodied and that the drawing is not to be construed as defining or limiting the scope of the invention, the claims appended hereto being relied upon for that purpose.

Referring to the figures of the drawing:—

Figure 1:
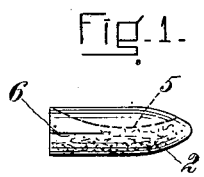
Fig. 1 is a side elevation of the body member of my improved fishing lure.
Figure 2:
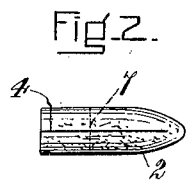
Fig. 2 is a plan view thereof.
Figure 3:
Fig. 3 illustrates the hook used.
Figure 4:
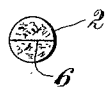
Fig. 4 is an end view of the body member.
Figure 5:
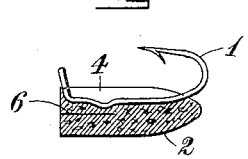
Fig. 5 is a sectional view showing the hook in place in the body member.
Figure 6:
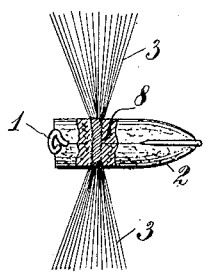
Fig. 6 is a plan view of the lure with the wings attached.
Figure 7:
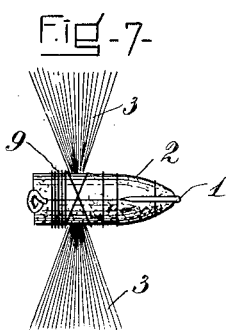
Fig. 7 is a like view of the completed lure.

As illustrated in the accompanying drawing, my improved fish lure comprises a hook 1, a body 2 of cork or like buoyant material, and a pair of wings 3 formed of hair or the equivalent. The hook 1 is of standard construction and the body 2 is formed of a shape and size to simulate the bug it is desired to imitate. In proceeding with the manufacture of my lure, I slit the body 2 longitudinally at 4 to a depth indicated at 5 and mount the hook in this slit. I also slit the head end of the body at 6 to a depth indicated at 7.

The next step is the mounting of the wings 3 in the slit 6. I form these wings of relatively stiff hair and my method of mounting, as herein disclosed, adds greatly to the natural moth, bug or fly appearance. I select the proper amount of hair and twist the same and insert the middle portion 8 thereof into the slit 6. I then quickly let loose of the ends of the twisted hair and such ends spring into a fan shape on each side of the body. By regulating the amount of hair to set in each bug, I can produce a solid wing effect or the transparent effect much desired in making the wings of aquatic insects. I thereafter trim the wings to closely simulate various bugs. It will of course be understood that an adhesive may be used in the slits 4 and 6 to aid in securing the hook and wings in place and aid in sealing the slits.

The lure is next painted the desired color and tied with strong thread 9 of a color to simulate the markings of the bug being copied. This thread also serves the purpose of securely closing the slits 4 and 6.

My fishing lure, as thus made, is lighter in construction than any lure previously designed for catching fish. This lure can also be made smaller than any lure and yet it has the buoyancy to float to such an extent that the line which is attached to it when fishing will not drag it under water. The lure heretofore made have been too cumbersome to successfully represent small bugs, moths and beetles, and furthermore such lure have contained too much wire and metal to form a floating lure which must be sufficiently buoyant to always stay on top of the water.

It will be understood that much of this buoyant effect is secured by using hair for wings, hair being hollow and therefore more buoyant than feathers, celluloid and like materials heretofore used. The use of hair for wings also has the further advantages of producing wings of the desired shape and transparency and with the least amount of work. The production of wings of the desired shape and appearance and the setting of the wings in the lure have heretofore been expensive in both time and money. My method produces a lure far superior in all respects and at far less cost. Heretofore the setting of the wings in a lure has been an operation requiring several minutes of painstaking work. My method of twisting the hair and inserting the same in the slit 6 can be performed in two seconds.

I claim:

1. A floating fish lure comprising a bullet-shaped body member of cork or the like, a hook cooperating therewith, and wings formed of relatively stiff hair secured to and extending laterally outwardly from the sides of the body in an outwardly diverging fan-like relation and in substantially a single plane extending transversely through the body parallel to the longitudinal axis thereof.

2. A floating fish lure comprising a body member of cork or the like, a hook cooperating therewith, and a pair of wings formed of a sheaf of relatively stiff hair secured to the body at the intermediate portion of the sheaf and extending transversely from opposite sides of the body in an outwardly diverging fan-like relation and substantially in a single plane extending transversely through the body parallel to the longitudinal axis thereof.

3. A floating fish lure comprising a body member of cork or the like, a hook mounted in a longitudinal slit in the body, a pair of relatively stiff hair-like wings mounted in a transverse slit in the body and extending transversely therefrom and laterally outward at each side of the body in an outwardly diverging fan-like relation and substantially in a single plane extending transversely through the body parallel to the longitudinal axis thereof, and a binder wound about the body forwardly and rearwardly of the wings in a manner holding the said slits closed.

4. The method of making a floating fish lure, consisting of providing a body of cork or the like, mounting a hook in a longitudinal slit in the body, providing a pair of wings on the body by so mounting a sheaf of relatively stiff hairs in a transverse slit therein that the ends of the hairs extend laterally outward at each side of the body substantially in a single plane extending through the body, and providing a winding about the body adjacent to the slit to hold the wings securely in place.

5. The method of making a floating fish lure, consisting of providing a body of cork or the like, mounting a hook on the body, providing a transverse slit through the body, and providing a pair of wings thereon by so mounting a twisted sheaf of relatively stiff hairs in the slit that the ends thereof extend laterally outward at each side of the body and spring into fan-shape and substantially in a single plane extending transversely through the body parallel to the longitudinal axis thereof when released.

In testimony whereof I affix my signature.

NORMAN E. L. MEANS.